US006306492B1

(12) United States Patent
Yamada et al.

(10) Patent No.: US 6,306,492 B1
(45) Date of Patent: Oct. 23, 2001

(54) LAMINATED POLYESTER FILM

(75) Inventors: Koji Yamada; Yasushi Sasaki; Toshitake Suzuki; Shinya Higashiura; Chikao Morishige, all of Ohtsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 08/997,459

(22) Filed: Dec. 23, 1997

(30) Foreign Application Priority Data

Dec. 26, 1996 (JP) .................................................. 8-347553

(51) Int. Cl.[7] ............................ B32B 5/18; B32B 27/06; B32B 27/36

(52) U.S. Cl. .................................... 428/317.7; 428/319.7; 428/336; 428/341; 428/480; 428/910

(58) Field of Search .................................... 428/480, 910, 428/317.7, 319.7, 336, 341; 525/48, 445

(56) References Cited

U.S. PATENT DOCUMENTS 5,171,625 * 12/1992 Newton ................................ 428/195
5,300,563 4/1994 Kiang et al. ........................... 525/42
5,380,590 * 1/1995 Nakamura et al. .................. 428/375
5,449,707 * 9/1995 Higashiura et al. ................. 523/501

FOREIGN PATENT DOCUMENTS 0 686 651 12/1995 (EP) .

OTHER PUBLICATIONS

Encyclopedia of Polymer Science and Engineering, vol. 10, Orientation: Influence of Orientation of Properties, pp. 613–616, Mar. 1988.*
Aldrich Catalog, 1996–1997, p. 1216.*
European Search Report dated Feb. 29, 2000.

* cited by examiner

*Primary Examiner*—Paul Thibodeau
*Assistant Examiner*—Ramsey Zacharia
(74) *Attorney, Agent, or Firm*—Morrison & Foerster LLP

(57) ABSTRACT

A laminated polyester film comprising a polyester base film and a layer comprising a polyester graft copolymer and which is formed at least on one surface of said polyester base film, said polyester graft copolymer comprising a hydrophobic copolymerizable polyester resin and an acid anhydride having at least one double bond grafted to said polyester resin. The laminated polyester film of the present invention exhibits good adhesive property, water resistance and resistance to blocking, particularly excellent adhesive property, by applying a specific polyester graft copolymer to a polyester base film.

14 Claims, No Drawings

LAMINATED POLYESTER FILM

TECHNICAL FIELD OF THE INVENTION

The present invention relates to a laminated polyester film having an improved adhesive property. More particularly, the present invention relates to a laminated polyester film exhibiting superior adhesive property as magnetic recording material, heat transfer recording material, sublimation transfer recording material, insulating material, photographic film, OHP film, mold releasing film, heat-sensitive recording material, heat transfer image receiving material, sublimation transfer image receiving material, ink jet image receiving material, offset printing plate, material for offset printing, pressure-sensitive recording paper, label, sticker, poster, card, various receiving materials for printers, various packaging materials, form printing paper, map, dust-free paper, display board, white board, electronic white board, printing paper, bottom label, wall paper, building material, bill, mold releasing paper, folding paper, calendar, magnetic card, tracing paper, slip, courier delivery slip, pressure-sensitive recording paper, copying paper, paper for clinical testing, parabolic antenna reflector, display reflector and the like.

BACKGROUND OF THE INVENTION

Biaxially stretched polyester films are superior in mechanical strength, heat resistance, chemical resistance and dimensional stability, so that they have been used in a wide range of applications, such as a base film for magnetic tape, an insulating tape, a photographic film, a tracing film, a food packaging film and the like. On the other hand, since polyester films generally have poor adhesive property, it is a common practice to subject a polyester film to a corona discharge surface treatment and to further form an anchor coating layer, when laminating thereon a layer of magnetic agent, photosensitive agent, mat agent and the like. As such anchor coating agent, a number of materials have been proposed, among which are water soluble or water dispersible polyester or acrylic resin to be used for a film having comparatively higher polarity, which is typically a polyester film (Japanese Patent Unexamined Publication Nos. 54-43017, Japanese Patent Examined Publication No. 49-10243 and U.S. Pat. No. 4,098,952). The above-mentioned polyester resin is defective in that a film having a layer made therefrom is susceptible to blocking when rolled, and the above-mentioned acrylic resin is defective in that it sometimes shows insufficient adhesion to a layer to be formed on the anchor coating layer. In an attempt to overcome these drawbacks, it is proposed to use the above-mentioned polyester resin and acrylic resin in mixture (Japanese Patent Unexamined Publication No. 58-124651), though such method does not always satisfactorily compensate for the drawbacks.

It has been also proposed to use various modified polyesters typically represented by one modified by grafting. For example, Japanese Patent Unexamined Publication Nos. 2-3307, 2-171243 and 2-310048 teach that a resin obtained by grafting a compound having an unsaturated bond to a water soluble or water dispersible polyester resin having a hydrophilic group is suitable as an anchor coating agent for a polyester film. Nevertheless, such a graft-modified resin, which has been made to have a hydrophilic group in advance in the polyester resin by, for example, copolymerization, is devoid of high adhesive property or water resistance.

In addition, Japanese Patent Unexamined Publication No. 3-273015 and U.S. Pat. No. 5,015,169 disclose that a graft-modified polyester resin is useful as an anchor coating agent for a polyester film. While such resin shows improved adhesive property in a dry state, it has poor cohesion, such that adhesive property under humidity becomes less and the film increasingly suffers from peeling off of a layer, development of flaws and the like, as the number of process increases.

It is therefore an object of the present invention to resolve the above-mentioned problems and provide a laminated polyester film having superior adhesive property, water resistance and resistance to blocking.

SUMMARY OF THE INVENTION

Accordingly, the present invention provides the following laminated polyester films.

(1) A laminated polyester film comprising a polyester base film and a layer comprising a polyester graft copolymer and which is formed at least on one surface of said polyester base film, said polyester graft copolymer comprising a hydrophobic copolymerizable polyester resin and an acid anhydride having at least one double bond grafted to said polyester resin.

(2) A laminated polyester film comprising a polyester base film and a layer comprising a polyester graft copolymer and which is formed at least on one surface of said polyester base film, said polyester graft copolymer comprising a hydrophobic copolymerizable polyester resin and at least one polymerizable unsaturated monomer grafted to said polyester resin, wherein said layer has a hydrogen bonding component of the surface energy ($\gamma s^h$) of not more than 35 erg/cm$^2$.

(3) The film of (1) or (2) above, wherein the polyester graft copolymer comprises a maleic anhydride.

(4) The film of (1) or (2) above, wherein the polyester graft copolymer comprises a maleic anhydride and a styrene.

(5) The film of (1) or (2) above, wherein the polyester graft copolymer has a glass transition temperature of not more than 30° C.

(6) The film of (1) or (2) above, which is formed by applying, to the base film, a coating solution comprising a polyester graft copolymer, thereby forming the layer comprising the graft copolymer, and then at least monoaxially stretching and thermally curing.

(7) The film of (2) above, wherein the $\gamma s^h$ is not more than 20 erg/cm$^2$.

(8) The film of (1) or (2) above, wherein the polyester base film is opaque white and has a light transmittance of less than 50%.

(9) The film of (8) above, wherein the opaque white polyester film has voids and an apparent specific gravity of not more than 1.3.

DETAILED DESCRIPTION OF THE INVENTION

In the present invention, by "being grafted" is meant introduction of a branched polymer distinct from the main chain polymer into the polymer main chain.

(Polyester Graft Copolymer)

The graft polymerization is generally performed by dissolving a hydrophobic copolymerizable polyester resin in an organic solvent, and allowing reaction of at least one kind of polymerizable unsaturated monomer by the use of a radical initiator with the polyester resin in the solution. The reaction product after completion of graft polymerization contains the desired graft copolymer of hydrophobic copolymerizable polyester and polymerizable unsaturated monomer, as well as ungrafted hydrophobic copolymerizable polyester resin and polymer of the above-mentioned unsaturated monomers that did not graft to the hydrophobic copolymerizable polyester. The polyester graft copolymer in the present invention means not only the above-mentioned polyester graft copolymer but also reaction mixture containing, in addition to said graft copolymer, unreacted hydrophobic copolymerizable polyester and polymer of unsaturated monomers that did not undergo grafting.

In the present invention, the polyester graft copolymer obtained by graft polymerization of at least one kind of polymerizable unsaturated monomer to hydrophobic copolymerizable polyester resin has an acid value of preferably not less than 600 eq/$10^6$ g, more preferably not less than 1200 eq/$10^6$ g. When the graft copolymer has an acid value of less than 600 eq/$10^6$ g, the adhesion between the layer containing the objective graft copolymer and a layer to be coated thereon becomes insufficient.

The weight ratio of hydrophobic copolymerizable polyester resin to polymerizable unsaturated monomer, which affords a desirable graft copolymer suitable for the object of the present invention, is preferably polyester/polymerizable unsaturated monomer=40/60–95/5, more preferably 55/45–93/7, and most preferably 60/40–90/10.

When the weight ratio of the hydrophobic copolymerizable polyester resin is less than 40 wt %, the obtained graft copolymer cannot exert superior adhesive property that polyesters originally possess. On the other hand, when the weight ratio of the hydrophobic copolymerizable polyester resin is greater than 95 wt %, the obtained graft copolymer tends to be associated with blocking which is a defect of polyesters.

The graft copolymer may be used in the form of a solution or dispersion of an organic solvent, or a solution of or dispersion in an aqueous solvent. In particular, a dispersion in an aqueous solvent, namely, the copolymer dispersed in water, is preferably used in view of working environment and coatability. Such resin dispersed in water can be generally obtained by graft polymerizing at least one kind of hydrophilic polymerizable unsaturated monomer to the aforementioned hydrophobic copolymerizable polyester resin in an organic solvent and then adding water and evaporating the organic solvent.

The polyester graft copolymer preferably has an average particle size as determined by laser scattering method of not more than 500 nm, particularly 10–500 nm, and appears semi-transparent or milky white. By adjusting polymerization process, graft copolymers having various particle sizes can be obtained. From the aspect of dispersion stability, the copolymer preferably has an average particle size of not more than 400 nm, more preferably not more than 300 nm. When it exceeds 500 nm, the gloss on the surface of the coating layer decreases, resulting in lowered transparency. On the other hand, when it is less than 10 nm, an improvement in water resistance, which is one of the objects of the present invention, becomes undesirably less.

The polymerizable unsaturated monomer to be grafted to hydrophobic copolymerizable polyester resin is a hydrophilic radically polymerizable monomer, which has a hydrophilic group or a group capable of converting to a hydrophilic group at a later stage. Examples of the hydrophilic group include carboxyl group, hydroxyl group, phosphoric acid group, phosphorus acid group, sulfo group, amido group, quaternary ammonium salt group and the like. Examples of the group capable of converting to a hydrophilic group include acid anhydride, glycidyl, chlorine and the like. Of these groups, carboxyl group is preferable which increases the acid value of a graft copolymer. Thus, a polymerizable unsaturated monomer having a carboxyl group or a group capable of converting to carboxyl group is preferable.

The glass transition temperature of the graft copolymer is preferably not more than 30° C., more preferably not more than 10° C. The use of a graft copolymer having a glass transition temperature of not more than 30° C. as the graft copolymer in the graft copolymer-containing layer affords a laminated polyester film superior in adhesive property.

When the properties of the graft copolymer deviate from the above-mentioned range, the effect of the layer comprising a graft copolymer cannot be easily exerted.

(Hydrophobic Copolymerizable Polyester Resin)

In the present invention, the hydrophobic copolymerizable polyester resin needs to be essentially insoluble in water, which means it inherently does not dissolve or cannot be dispersed in water easily. The use of a polyester resin dispersible or soluble in water in graft polymerization degrades the objective adhesive property and water resistance.

The composition of the dicarboxylic acid of said hydrophobic copolymerizable polyester resin is preferably aromatic dicarboxylic acid 60–99.5 mol %, aliphatic dicarboxylic acid and/or alicyclic dicarboxylic acid 0–40 mol %, and polymerizable unsaturated double bond-containing dicarboxylic acid 0.5–10 mol %. When the aromatic dicarboxylic acid is less than 60 mol % or when aliphatic dicarboxylic acid and/or alicyclic dicarboxylic acid exceed(s) 40 mol %, adhesion strength is decreased.

When dicarboxylic acid having a polymerizable unsaturated double bond is contained in a proportion of less than 0.5 mol %, polymerizable unsaturated monomer cannot be efficiently grafted to hydrophobic copolymerizable polyester resin, and conversely, when it exceeds 10 mol %, the viscosity increases too much in the latter half of the graft polymerization, which unpreferably prevents uniform progress of the polymerization. More preferably, aromatic dicarboxylic acid is contained by 70–98 mol %, aliphatic dicarboxylic acid and/or alicyclic dicarboxylic acid by 0–30 mol %, and dicarboxylic acid containing polymerizable unsaturated double bond by 2–7 mol %.

Examples of the aromatic dicarboxylic acid include terephthalic acid, isophthalic acid, orthophthalic acid, naphthalenedicarboxylic acid, biphenyldicarboxylic acid and the like. It is not preferable that hydrophilic group-containing dicarboxylic acid, such as sodium 5-sulfoisophthalic acid, be used, since its use decreases water resistance, an improvement of which is one of the objects of the present invention. Examples of aliphatic dicarboxylic acid include succinic acid, adipic acid, azelaic acid, sebacic acid, dodecanedionic acid, dimer acid and the like; examples of alicyclic dicarboxylic acid include 1,4-cyclohexanedicarboxylic acid, 1,3-cyclohexanedicarboxylic acid, 1,2-cyclohexanedicarboxylic acid and acid anhydrides thereof.

Examples of dicarboxylic acid containing polymerizable unsaturated double bond include fumaric acid, maleic acid, maleic anhydride, itaconic acid, citraconic acid and the like as $\alpha,\beta$-unsaturated dicarboxylic acid; as alicyclic dicarboxylic acid having an unsaturated double bond, 2,5-norbornenedicarboxylic anhydride, tetrahydrophthailc anhydride and the like. Of these, preferred in view of polymerizability are fumaric acid, maleic acid and 2,5-norbornenedicarboxylic acid.

Examples of glycol component include at least one member from aliphatic glycol having 2 to 10 carbon atoms, alicyclic glycol having 6 to 12 carbon atoms, ether bond-containing glycol, and the like, which may be used alone or in combination. Exemplified as aliphatic glycol having 2 to 10 carbon atoms are ethylene glycol, 1,2-propylene glycol, 1,3-propanediol, 1,4-butanediol, 1,5-pentanediol, neopentyl glycol, 1,6-hexanediol, 3-methyl-1,5-pentanediol, 1,9-nonanediol, 2-ethyl-2-butylpropanediol and the like. Examples of alicyclic glycol having 6 to 12 carbon atoms include 1,4-cyclohexanedimethanol and the like.

Examples of glycol having an ether bond include diethylene glycol, triethylene glycol, dipropylene glycol, glycols obtained by adding ethylene oxide or propylene oxide to two phenolic hydroxyl groups of bisphenols, such as 2,2-bis(4-hydroxyethoxyphenyl)propane and the like. Where necessary, polyethylene glycol, polypropylene glycol, polytetramethylene glycol and the like may be used.

A polycarboxylic acid and/or a polyol, both having three or more functional groups, may be copolymerized into the hydrophobic copolymerizable polyester resin in a proportion of 0–5 mol %. Examples of polycarboxylic acid having three or more functional groups include trimellitic acid (anhydrous), pyrromellitic acid (anhydrous), benzophenonetetracarboxylic acid (anhydrous), trimesic acid, ethylene glycol bis(anhydrotrimellitate), glycerol tris (anhydrotrimellitate) and the like. Examples of polyol having three or more functional groups include glycerol, trimethylolethane, trimethylolpropane, pentaerythritol and the like. The polycarboxylic acid and/or polyol, both having three or more functional groups, are/is contained in a proportion of 0–5 mol %, preferably 0–3 mol %, of the entire acid component or entire glycol component. When they/it exceed(s) 5 mol %, the polyester resin easily becomes a gel during polymerization.

The weight average molecular weight of the hydrophobic copolymerizable polyester resin is preferably 5000–50000. When the molecular weight is less than 5000, adhesive strength becomes poor, whereas when it exceeds 50000, gelation during polymerization occurs.

(Grafted Moiety of Polyester Graft Copolymer)

The polymerizable unsaturated monomer may be, for example, fumaric acid; monoester or diester of fumaric acid, such as monoethyl fumarate, diethyl fumarate and dibutyl fumarate; maleic acid and anhydride thereof; monoester or diester of maleic acid, such as monoethyl maleate, diethyl maleate and dibutyl maleate; itaconic acid and anhydrides thereof; monoester or diester of itaconic acid; maleimide such as phenyl maleimide; styrene; styrene derivatives such as α-methylstyrene, t-butylstyrene and chloromethylstyrene; vinyl toluene; divinyl benzene; and the like. An acrylic polymerizable monomer, which is one of the polymerizable unsaturated monomers, is, for example, alkyl acrylate, alkyl methacrylate wherein alkyl is exemplified by methyl, ethyl, n-propyl, isopropyl, n-butyl, isobutyl, t-butyl, 2-ethylhexyl, cyclohexyl, phenyl, benzyl, phenylethyl and the like; hydroxy-containing acrylic monomers such as 2-hydroxyethyl acrylate, 2-hydroxyethyl methacrylate, 2-hydroxypropyl acrylate and 2-hydroxypropyl methacrylate; amide group-containing acrylic monomers such as acrylamide, methacrylamide, N-methylmethacrylamide, N-methylacrylamide, N-methylolacrylamide, N-methylolmethacrylamide, N,N-dimethylolacrylamide, N-methoxymethylacrylamide, N-methoxymethylmethacrylamide and N-phenylacrylamide; amino group-containing acrylic monomers such as N,N-diethylaminoethyl acrylate and N,N-diethylaminoethyl methacrylate; epoxy group-containing acrylic monomers such as glycidyl acrylate and glycidyl methacrylate; acrylic monomers containing carboxyl group or a salt thereof, such as acrylic acid, methacrylic acid and salts thereof (e.g., sodium salt, potassium salt and ammonium salt); and the like. However, as long as acrylic polymerizable monomer shows less effect of lowering the hydrogen bonding component of the surface energy, $\gamma s^h$, the use thereof in the present invention is not recommended. The above-mentioned polymerizable unsaturated monomers can be copolymerized by using one or two kinds thereof.

Of the above-mentioned monomers, maleic anhydride, ester thereof, and the combination of maleic anhydride and styrene are most preferable.

(Polymerization Initiator and Other Additives)

As the graft polymerization initiator to be used in the present invention, organic peroxides and organic azo compounds can be used, which are known to those of ordinary skill in the art.

As the organic peroxides, usable are benzoylperoxide and t-butyl peroxypivalate, and as the organic azo compound, usable are 2,2'-azobisisobutyronitrile, 2,2'-azobis(2,4-dimethylvaleronitrile) and the like.

The amount of the polymerization initiator for graft polymerization is at least 0.2 wt %, preferably not less than 0.5 wt %, relative to the polymerizable unsaturated monomer.

Besides the polymerization initiator, a chain transfer agent, such as octyl mercaptan, mercaptoethanol, 3-t-butyl-4-hydroxyanisole and the like can be used as necessary to adjust the chain length of the branched polymer. The chain transfer agent is preferably used in a proportion of 0–5 wt % of polymerizable unsaturated monomer.

(Polyester Base Film)

The polyester usable for the polyester base film includes, for example, polyesters produced by condensation polymerization of an aromatic dicarboxylic acid or an ester thereof, such as terephthalic acid, isophthalic acid and naphthalenedicarboxylic acid, with a glycol, such as ethylene glycol, diethylene glycol, 1,4-butanediol and neopentyl glycol.

These polyesters can be produced by directly reacting an aromatic dicarboxylic acid with a glycol, or by a method comprising ester exchange reaction of an alkyl ester of aromatic dicarboxylic acid and glycol, followed by condensation polymerization, or by a method comprising condensation polymerization of diglycol ester of aromatic dicarboxylic acid. Typical examples of the polyester are polyethylene terephthalate, polyethylene butylene terephthalate, polyethylene-2,6-naphthalate and the like. This polyester may be a homopolymer or a copolymer with a third component.

In any case, it is preferable that the polyester to be used in the present invention comprise ethylene terephthalate units, butylene terephthalate units or ethylene-2,6-naphthalate units in a proportion of not less than 70 mol %, preferably not less than 80 mol %, and more preferably not less than 90 mol %.

The polyester base film in the present invention is a biaxially stretched film made from the above-mentioned polyester as a main starting material, which can contain various additives as long as the object of the present invention is not impaired. Examples of the additive include antioxidant, light stabilizer, gelation preventive, inorganic or organic fine particles inactive with the polyester, lubricant, blocking preventive, pigment, antistatic, ultraviolet absorber, surfactant and the like.

One preferable embodiment of the present invention comprises the use of an opaque white polyester base film having a percent light transmission of less than 50%. The use of such film leads to the provision of an extremely useful material as a base for various information recording materials such as printing paper.

The above-mentioned opaque white polyester film can be obtained by including white particles in the film, by adding a resin incompatible with polyester to form voids in the interface between the copolymer forming the film and the resin or other method. These methods may be used alone or in combination.

When an opaque white polyester film is obtained by forming voids inside the film, the voids to be included in the film preferably make the apparent specific gravity of the film 0.6–1.3. A film having an apparent specific gravity of not more than 1.3 exhibits cushioning property in the entirety of the film, thereby affording a superior feature as a recording material. On the other hand, a film having an apparent specific gravity of less than 0.6 is disadvantageous in that it loses flexibility of the polyester film.

The resin incompatible with polyester, which is to be used for forming voids in the film, is subject to no particular limitation and exemplified by thermoplastic resin such as polystyrene resin, polyolefin resin, polyacrylic resin, polycarbonate resin, polysulfonic resin, cellulose resin and the like. Of these, polystyrene resin and polyolefin resin such as polymethylpentene and polypropylene are preferably used.

These void forming agents, namely, thermoplastic resins incompatible with polyester, are preferably added to polyester in an amount of 3–20 wt %, more preferably 5–18 wt %, of the entire film, though subject to variation depending on the volume of voids desired. When it is less than 3 wt %, voids cannot be formed in greater volumes. Conversely, when it exceeds 20 wt %, drawability of the film is strikingly impaired and flexibility of polyester film is lost.

The particles that can be added for an improved whiteness and opacity may be inorganic particles or organic particles and are subject to no particular limitation. For example, titanium dioxide, calcium carbonate, barium sulfate, zinc sulfite, silicon dioxide, aluminum oxide, talc, kaoline and the like can be used. The surface of these particles may be treated as necessary. Such surface treating agent may be, but not limited to, aluminum oxide, silicon dioxide, zinc oxide, silicon resin, siloxane resin, fluororesin, silane coupling agent, titanate coupling agent, polyol, polyvinylpyridine and the like.

The particles may be added in an optional amounts, though preferred amount thereof is 1–20 wt % of the entire film. When the amount to be added is less than 1 wt %, opacity becomes insufficient and when it exceeds 20 wt %, drawability of the film is degraded.

The polyester base film may be a single layer or a laminate of two or more kinds of layers having different compositions.

(Laminated Polyester Film)

With regard to the inventive laminated polyester film, the layer comprising a graft copolymer, which is to be present on at least one surface of the above-mentioned polyester base film, can be formed by applying a coating solution containing the above-mentioned graft copolymer to a polyester base film.

As the coating solution, a solution of or dispersion in an organic solvent of the graft copolymer constituting the layer containing the graft copolymer, or a solution of or dispersion in an aqueous solvent of said graft copolymer may be used. In particular, an aqueous solution and an aqueous dispersion are preferable, since organic solvent poses problems to the environment.

The solid content of the graft copolymer in an organic solvent or aqueous solvent is generally 1 wt %–50 wt %, preferably 3 wt %–30 wt %.

The above-mentioned graft copolymer can form a layer containing the graft copolymer as it is. When a crosslinking agent (resin for curing) is added and the film is cured, high water resistance can be imparted to the layer containing the graft copolymer.

Examples of the crosslinking agent include phenol-formaldehyde resin comprising a condensate of alkylated phenols and formaldehyde such as cresols; amino resins such as an adduct of formaldehyde with urea, melamine, benzoguanamine and the like, and alkyl ether compound comprising said adduct and an alcohol having 1 to 6 carbon atoms; multifunctional epoxy compounds; multifunctional isocyanate compounds; block isocyanate compounds; multifunctional aziridine compounds; oxazoline compounds and the like.

The phenol-formaldehyde resin may be, for example, a condensate of formaldehyde and a phenol such as alkylated (methyl, ethyl, propyl, isopropyl or butyl)phenol, p-tert-amylphenol, 4,4'-sec-butylydenephenol, p-tert-butylphenol, o-, m-, p-cresol, p-cyclohexylphenol, 4,4'-isopropylidene phenol, p-nonylphenol, p-octylphenol, 3-pentadecylphenol, phenol, phenyl-o-cresol, p-phenylphenol and xylenol.

Examples of amino resin include, for example, methoxylated methylolurea, methoxylated methylol N,N-ethyleneurea, methoxylated methyloldicyandiamide, methoxylated methylolmelamine, methoxylated methylolbenzoguanamine, butoxylated methylolmelamine, butoxylated methylolbenzoguanamine and the like, with preference given to methoxylated methylolmelamine, butoxylated methylolmelamine and methylol benzoguanamine.

Examples of multifunctional epoxy compound include diglycidyl ether of bisphenol A and oligomer thereof, diglycidyl ether of hydrogenated bisphenol A and oligomer thereof, diglycidyl orthophthalate, diglycidyl isophthalate, diglycidyl terephthalate, diglycidyl p-hydroxybenzoate, diglycidyl tetrahydrophthalate, diglycidyl hexahydrophthalate, diglycidyl succinate, diglycidyl adipate, diglycidyl sebacate, ethylene glycol diglycidyl ether, propylene glycol diglycidyl ether, 1,4-butanediol diglycidyl ether, 1,6-hexanediol diglycidyl ether and polyalkylene glycol diglycidyl ethers, triglycidyl trimellitate, triglycidyl isocyanulate, 1,4-diglycidyloxybenzene, diglycidylpropylene urea, glycerol triglycidyl ether, trimethylolpropane triglycidyl ether, pentaerythritol triglycidyl ether, triglycidyl ether of glycerolalkylene oxide adduct and the like.

As the multifunctional isocyanate compound, low or high molecular weight aromatic or aliphatic diisocyanate, polyisocyanate having 3 or more functional groups and the like can be used. Examples of polyisocyanate include tetramethylene diisocyanate, hexamethylene diisocyanate, toluene diisocyanate, diphenylmethane diisocyanate, hydrogenated diphenylmethane diisocyanate, xylylene diisocyanate, hydrogenated xylylene diisocyanate, isophorone diisocyanate and trimers of these isocyanate compounds. Moreover, compounds having terminal isocyanate may be used, which are obtained by reacting an excess isocyanate compound and a low molecular weight active hydrogen compound such as ethylene glycol, propylene glycol, trimethylolpropane, glycerol, sorbitol, ethylenediamine, monoethanolamine, diethanolamine and triethanolamine, or a high molecular weight active hydrogen compound such as polyether polyols, polyether polyols and polyamides.

The block isocyanate can be obtained by addition reaction of the above-mentioned isocyanate compound and a blocking agent by an appropriate method conventionally known. Examples of the agent for blocking isocyanate include phenols such as phenol, cresol, xylenol, resorcinol, nitrophenol, chlorophenol and the like; thiophenols such as thiophenol, methylthiophenol and the like; oximes such as acetoxime, methyl ethyl ketoxime, cyclohexanoneoxime and the like; alcohols such as methanol, ethanol, propanol, butanol and the like; halogen substituted alcohols such as ethylenechlorhydrine, 1,3-dichloro-2-propanol and the like; tertiary alcohols such as t-butanol, t-pentanol and the like; lactams such as ε-caprolactam, δ-valerolactam, ν-butylolactam, β-propyllactam and the like; aromatic amines; imides; active methylene compounds such as acetylacetone, acetoacetate, ethyl malonate and the like; mercaptans, imines, ureas, diaryl compounds; sodium bisulfite; and the like.

These crosslinking agents may be used alone or in combination.

The amount of crosslinking agent is preferably 5–40 parts by weight per 100 parts by weight of the polyester graft copolymer.

The crosslinking agent is added by the following methods. (1) When the crosslinking agent is water soluble, it is directly dissolved or dispersed in a solution or dispersion containing the graft copolymer and a solvent. (2) When the crosslinking agent is soluble in oil, it is added to a reaction mixture after graft polymerization. These methods can be selected as appropriate according to the kind and properties of the crosslinking agent. A curing agent and a promoting agent may be added along with the crosslinking agent.

It is also possible to add an additive, such as antistatic, inorganic lubricant, organic lubricant and the like, to the layer containing a graft copolymer, as long as the addition does not impair the effect of the present invention. These additives are contained in a coating solution and applied to the surface of the base.

A layer containing a graft copolymer can be formed by applying a coating solution containing the graft copolymer to a polyester base film by a known method, such as gravure method, reverse method, die method, bar method, dip method and the like.

The coating solution is applied in an amount in solid content of 0.01–1 $g/m^2$, preferably 0.02–0.5 $g/m^2$. When the amount is not more than 0.01 $g/m^2$, sufficient strength cannot be achieved in the adhesion to the layer containing the graft copolymer. When it is not less than 1 $g/m^2$, blocking occurs, causing a practical problem.

The layer containing graft copolymer is formed by applying the above-mentioned coating solution to a biaxially oriented polyester base film, or by applying the above-mentioned coating solution to an unoriented or monoaxially oriented polyester base film, drying the film and, where necessary, monoaxial or biaxial orientation and thermal curing. When a biaxially oriented polyester base film is used, the film becomes strong by drying and thermally curing at not less than 150° C., preferably not less than 200° C., after application of the coating solution, whereby the adhesive property between the layer containing graft copolymer and the polyester base film can be improved.

When orientation is applied after coating, the drying after coating is required to adjust the moisture content of the coated film to 0.1–2 wt %, so that the drawability of the coated film may not be impaired.

A preferable embodiment of the present invention is a film wherein the thus-obtained layer containing polyester graft copolymer and having a specific composition has a hydrogen bonding component of the surface energy, $\gamma s^h$, in a specific range. To provide such film, a coating solution containing a polyester graft copolymer containing, in a graft chain, a polymerizable unsaturated monomer, particularly, an acid anhydride, is applied and dried at the above-mentioned temperature. As a result, the hydrogen bonding component of the surface energy can be adjusted to the above-mentioned specific range with ease.

The hydrogen bonding component ($\gamma s^h$) relative to the total surface energy ($\gamma s$) of the film can be evaluated according to the method described by D. K. Owens et al. in Journal of Applied Polymer Science, vol. 13, pp. 1741–1747 (1969).

To be specific, using the relational expression (equation 1) of dispersion force component ($\gamma s^h$) and hydrogen bonding component ($\gamma s^h$) relative to individual total surface energy ($\gamma s$), dispersion force component ($\gamma l^d$) and hydrogen bonding component ($\gamma l_h$) relative to liquid total surface energy ($\gamma l$), and contact angle ($\theta$) of said liquid (1) with the surface of said individual (s):

$$1+\cos\theta = 2\sqrt{\gamma s^d}\left(\frac{\sqrt{\gamma l^d}}{\gamma l}\right)+2\sqrt{\gamma s^h}\left(\frac{\sqrt{\gamma l^h}}{\gamma l}\right)$$

and inserting the contact angles $\theta 1$ and $\theta 2$ of two kinds of liquids l1, l2, whose $\gamma l^d$ and $\gamma l^h$ are respectively known, with the surface of the film, into said equation, the simultaneous equation with two unknowns is solved to obtain $\gamma s^d$ and $\gamma s^h$, based on which the $\gamma s^h$ is evaluated.

Specifically, using two kinds of liquids, water and methylene iodide, and the following values derived from each contact angle, the calculation is done.

TABLE 1

| liquid (20° C.) | $\gamma l^d$ | $\gamma l^h$ | $\gamma l$ |
|---|---|---|---|
| water | 21.8 | 21.8 | 72.8 |
| methylene iodide | 49.5 | 1.3 | 50.8 |

For the present invention to fully exert its effect, the value of $\gamma s^h$ is preferably set to not more than 35 $erg/cm^2$, more preferably not more than 20 $erg/cm^2$, and particularly preferably not more than 15 $erg/cm^2$. The method for setting $\gamma s^h$ to not more than 35 $erg/cm^2$ includes setting the amount of the polymerizable unsaturated monomer contained in the polyester graft copolymer to not less than 5 wt % and controlling the temperature of drying, which is necessary for forming a layer containing a graft copolymer, to not less than 100° C., preferably not less than 150° C., more preferably not less than 200° C.

When the value of $\gamma s^h$ is outside the above-mentioned range, adhesive property under humidity becomes less and the film increasingly suffers from peeling off of the film, development of flaws and the like, as the number of process increases.

The present invention is described in more detail by way of Examples, which should not be construed as limiting the invention. In the Examples, "part" means "part by weight" and "%" means "wt %". Each of the following items was determined by the methods given below.

1) Adhesive Property I

To a polyester film or a polyester film having a layer containing a graft copolymer was applied Fuji Black and White Photographic Emulsion (Art Emulsion, manufactured by Fuji Photo Film Co., Ltd.) in a dark room, and the film was left standing in an incubator controlled to 20° C., 60% RH for 24 hr to form a 7 μm thick film. After forming the film, the surface thereof was cross-cut by a cross-cut method. A cellophane adhesive tape (manufactured by NICHIBAN COMPANY, LIMITED) was adhered onto the cross-cut. Then, the tape was peeled off at once and the surface was evaluated as follows.

polyester film with entire emulsion film left thereon ○ polyester film with half of emulsion film left thereon Δ polyester film with most of emulsion film transferred to adhesive tape ×

2) Adhesive Property II

To a polyester film or a polyester film having a layer containing a graft copolymer was applied a 10% aqueous solution of polyvinyl alcohol (GOHSENOL GH-17R, manufactured by The Nippon Synthetic Chemical Industry Co., Ltd., polymerization degree 1800, saponification degree 88%), and the film was dried at 150° C. for 3 min to form a 10 μm thick film. After forming the film, the surface thereof was cross-cut by a cross-cut method. A cellophane adhesive tape (manufactured by NICHIBAN COMPANY, LIMITED) was adhered onto the cross-cut. Then, the tape was peeled off at once and the surface was evaluated as follows.

polyester film with entire polyvinyl alcohol film left thereon ○ polyester film with half of polyvinyl alcohol film left thereon Δ polyester film with most of polyvinyl alcohol film transferred to adhesive tape ×

3) Hydrogen Bonding Component of the Surface Energy ($\gamma s^h$)

The hydrogen bonding component of the surface energy ($\gamma s^h$) was obtained by determining contact angles with water and methylene iodide using a contactometer manufactured by Kyowa Interface Science Co., Ltd. and calculating by the above-mentioned calculation formula.

4) Blocking Property

The surface having a layer containing a graft copolymer and the surface of a polyester base film were closely adhered to each other and cut into 8×12 cm, which piece was sandwiched between two silicone rubber sheets, and then with glass boards. A 2 kg load was applied on the glass board and the specimen was left standing at 40° C., 80% RH for 24 hr. The film was removed and blocking on the graft copolymer-containing layer of the film was visually observed. The blocking property was evaluated as follows.

Area associated with blocking is less than 5% of entire film area: ○

Area associated with blocking is 5–20% of entire film area: Δ

Area associated with blocking exceeds 20% of entire film area: ×

5) Glass Transition Temperature (Tg)

A solution or dispersion of a graft copolymer was applied to a glass board, which was dried at 170° C. to obtain the graft copolymer in solid. The solid (10 mg) thereof was placed on a sample pan, and scanned with a differential scanning calorimeter at a rate of 10° C./min to determine Tg.

6) Apparent Specific Gravity

A film was accurately cut out into a 10 cm×10 cm accurate square and the thickness thereof was determined at 50 points to give an average thickness t (unit μm). Then, the sample was weighed to the order of 0.1 mg, which was taken as w (unit g). According to the following formula, an apparent specific gravity was calculated.

$$\text{Apparent specific gravity } (-)=(w/t)\times 10000$$

7) Percent Light Transmission

According to JIS-K-6714 and using Integrating Sphere H.T.R Meter (manufactured by Nippon Seimitsu Kagaku) according to JIS-K-7105, the percent light transmission of the film was determined.

(Preparation of Hydrophobic Copolymerizable Polyester)

In a stainless steel autoclave equipped with a stirrer, a thermometer and a partial refluxing condenser were charged dimethyl terephthalate (345 parts), 1,4-butanediol (211 parts), ethylene glycol (270 parts) and tetra-n-butyl titanate (0.5 part), and ester exchange reaction was conducted from 160° C. to 220° C. over 4 hr. Then, fumaric acid (14 parts) and sebacic acid (160 parts) were added, and the mixture was heated from 200° C. to 220° C. over 1 hr for esterification. Then, the mixture was heated to 255° C. and the reaction system was gradually depressurized. The reaction proceeded for 1.5 hr under depressurization at 0.22 mmHg to give polyester resin (A-1). The obtained polyester was pale-yellow and transparent.

In the same manner as above, a polyester resin (A-2) having a different composition was obtained. The composition as determined by NMR and weight average molecular weight of (A-1) and (A-2) are shown in Table 2.

TABLE 2

| | A-1 | A-2 |
|---|---|---|
| composition of copolymer (mol %) | | |
| terephthalic acid | 70 | 67 |
| sebacic acid | 26 | 26 |
| sodium 5-sulfoisophthalate | — | 3 |
| fumaric acid | 4 | 4 |
| ethylene glycol | 50 | 50 |
| 1,4-butanediol | 50 | 50 |
| weight average molecular weight | 20000 | 18000 |

EXAMPLE 1

In a reactor equipped with a stirrer, a thermometer, a refluxing device and a quantitative dripping device were charged the hydrophobic copolymerizable polyester resin (A-1) (75 parts), methyl ethyl ketone (56 parts) and isopropyl alcohol (19 parts), and the mixture was heated and stirred at 65° C. to dissolve resin (A-1). After complete dissolution of resin (A-1), maleic anhydride (15 parts) was added to the polyester solution. Then, styrene (10 parts) and azobisdimethyl-valeronitrile (1.5 parts) were dissolved in 12 parts of methyl ethyl ketone, which solution was added dropwise at 0.1 ml/min to the polyester solution, followed by stirring for 2 hr. A sample for analysis was taken from the reaction mixture, and methanol (5 parts) was added. Water (300 parts) and triethylamine (15 parts) were added to the reaction mixture, which was followed by stirring for 1 hr. The inner temperature of the reactor was raised to 100° C. and methyl ethyl ketone, isopropyl alcohol and excess triethylamine were removed by distillation to give polyester graft copolymer (B-1) dispersed in water. The aqueous graft copolymer dispersion (B-1) was pale-yellow and transparent, and the copolymer therein had a glass transition temperature of −10° C.

The aqueous graft copolymer dispersion (B-1) was diluted with water:isopropyl alcohol=1:1 (weight ratio) to a solid content of 10% to give a coating solution for forming a layer containing a graft copolymer. Polyethylene terephthalate was melt-extruded at 280° C., cooled on cooling roller at 15°

C. to give a 1000 μm thick unoriented film. This unoriented film was drawn 3.5 times in the longitudinal direction between a pair of rolls having different circumferential speeds, at 85° C. Then, the above-mentioned coating solution was applied to the monoaxially oriented film by a roll coater method, dried with hot air at 70° C., transversely drawn 3.5 times on a tenter at 98° C. and thermally cured at 200–210° C. to give a biaxially oriented laminated polyester film having a 100 μm thick layer containing a graft copolymer. The final coating amount (solid) of the above-mentioned coating solution was 0.2 g/m$^2$. The obtained film was evaluated, the results of which are shown in Table 3.

EXAMPLE 2

In the same manner as in Example 1 except that a mixture of maleic anhydride (8 parts) and styrene (17 parts) was used instead of maleic anhydride (15 parts), an aqueous graft copolymer dispersion (B-2) was obtained. Said aqueous graft copolymer dispersion (B-2) was pale-yellow and transparent, and the copolymer therein had a glass transition temperature of −10° C.

In the same manner as in Example 1 except that the aqueous graft copolymer dispersion (B-2) was used instead of the aqueous graft copolymer dispersion (B-1), a laminated polyester film having graft copolymer-containing layer was obtained. The obtained film was evaluated, the results of which are shown in Table 3.

EXAMPLE 3

In a reactor equipped with a stirrer, a thermometer, a refluxing device and a quantitative dripping device were charged hydrophobic copolymerizable polyester resin (A-1) (75 parts), methyl ethyl ketone (56 parts) and isopropyl alcohol (19 parts), and the mixture was heated and stirred at 65° C. to dissolve resin (A-1). After complete dissolution of resin (A-1), maleic anhydride (15 parts) was added to the polyester solution. Then, styrene (10 parts) and azobisdimethyl-valeronitrile (1.5 parts) were dissolved in 12 parts of methyl ethyl ketone, which solution was added dropwise at 0.1 ml/min to the polyester solution, followed by stirring for 2 hr to give a graft copolymer solution (B-3) dissolved in a solvent. The graft copolymer solution (B-3) had a glass transition temperature of −10° C.

The graft copolymer solution (B-3) was diluted with methyl ethyl ketone to a solid content of 5% to give a coating solution for forming a layer containing a graft copolymer. Said coating solution was applied to a 100 μm thick biaxially oriented polyester film manufactured by Toyo Boseki Kabushiki Kaisha with a roll coater and dried at 150° C. to give a laminated polyester film having a layer containing a graft copolymer. The final amount (solid) coated of the above-mentioned coating solution was 0.2 g/m$^2$. The obtained film was evaluated, the results of which are shown in Table 3.

Comparative Example 1

In the same manner as in Example 1 except that hydrophilic copolymerizable polyester resin (A-2) was used instead of hydrophobic copolymerizable polyester resin (A-1), an aqueous graft copolymer dispersion (B-4) was obtained. Said aqueous graft copolymer dispersion (B-4) was pale-yellow and transparent, and the copolymer therein had a glass transition temperature of −15° C.

In the same manner as in Example 1 except that aqueous graft copolymer dispersion (B-2) was used instead of aqueous graft copolymer dispersion (B-1), a laminated polyester film having graft copolymer-containing layer was obtained. The obtained film was evaluated, the results of which are shown in Table 3.

Comparative Example 2

In a reactor equipped with a stirrer, a thermometer, a refluxing device and a quantitative dripping device were charged hydrophobic copolymerizable polyester resin (A-1) (75 parts), methyl ethyl ketone (56 parts) and isopropyl alcohol (19 parts), and the mixture was heated and stirred at 65° C. to dissolve resin (A-1). After complete dissolution of resin (A-1), a mixture of methacrylic acid (17.5 parts) and ethyl acrylate (7.5 parts) and azobisdimethylvaleronitrile (1.2 parts) were dissolved in 25 parts of methyl ethyl ketone, which solution was added dropwise at 0.2 ml/min to the polyester solution, followed by stirring for 2 hr. A sample for analysis was taken from the reaction mixture. Water (300 parts) and triethylamine (25 parts) were added to the reaction mixture, which was followed by stirring for 1 hr. The inner temperature of the reactor was raised to 100° C. and methyl ethyl ketone, isopropyl alcohol and excess triethylamine were removed by distillation to give aqueous graft copolymer dispersion (B-5). The aqueous graft copolymer dispersion (B-5) was pale-yellow, and transparent and the copolymer therein had a glass transition temperature of −20° C.

In the same manner as in Example 1 and using the above-mentioned aqueous graft copolymer dispersion (B-5), a laminated polyester film having graft copolymer-containing layer was obtained. The obtained film was evaluated, the results of which are shown in Table 3.

EXAMPLE 4

The aqueous graft copolymer dispersion (B-1) obtained in Example 1 was diluted with water:isopropyl alcohol=1:1 (weight ratio) to a solid content of 5% to give a coating solution for forming a layer containing a graft copolymer. Said coating solution was applied to the same 100 μm thick biaxially oriented polyester film as used in Example 3 with a roll coater and dried at 120° C. to give a laminated polyester film having a layer containing a graft copolymer. The final coating amount of the above-mentioned coating solution (solid) was 0.2 g/m$^2$. The obtained film was evaluated, the results of which are shown in Table 3.

TABLE 3

| | $\gamma s^h$ erg/cm$^2$ | adhesive property I | adhesive property II | blocking property | light transmission (%) |
|---|---|---|---|---|---|
| Example 1 | 5.0 | ○ | ○ | ○ | 88.7 |
| Example 2 | 5.6 | ○ | ○ | ○ | 89.1 |
| Example 3 | 12.7 | ○ | ○ | ○ | 87.6 |
| Example 4 | 27.1 | Δ | Δ | ○ | 87.3 |
| Com. Ex. 1 | 37.1 | x | x | Δ | 87.8 |
| Com. Ex. 2 | 43.1 | x | x | Δ | 86.1 |

EXAMPLES 5 AND 6

A mixture of polystyrene resin (15%, TOPOREX 570-57U, manufactured by MITSUI TOATSU CHEMICALS, INC.) having a melt flow rate of 1.7, polyethyleneterephthalate resin (80%) having an intrinsic viscosity of 0.64, and ANATASE titanium dioxide (5%, TA-300, manufactured by Fuji Titanium Co., Ltd.) having an average particle size of 0.2 μm by an electron microscopy was used as a starting material, which was fed into a vent type extruder.

Using a T die, the mixture was extruded onto a cooling drum controlled to 30° C. to give an about 2 mm thick unoriented sheet.

The obtained unoriented sheet was uniformly heated at 78° C. using a heating roll, and drawn 3.4 times with heating by an IR heater from the both sides of the film between nip rolls.

The same coating solution for forming a layer containing a graft copolymer as used in Example 1 and Example 2 was applied to the thus-obtained monoaxially oriented film and dried in the same manner as in Example 1. The film was led to a tenter where it was transversely drawn 3.9 times at 130° C. and tentered, which was followed by heat treatment at 220° C. for 5 sec, to give a 188 μm thick white opaque laminated polyester film. The obtained film was evaluated, the results of which are shown in Table 4.

EXAMPLES 7 AND 8

In the same manner as in Example 5 except that the coating solution used in Examples 3 and 4 was used as the coating solution for forming a layer containing a graft copolymer, a white opaque laminated polyester film was obtained. The obtained film was evaluated, the results of which are shown in Table 4.

TABLE 4

| | $\gamma s^h$ erg/cm$^2$ | adhesive property I | adhesive property II | blocking property | light trans-mission (%) | apparent specific gravity |
|---|---|---|---|---|---|---|
| Ex. 5 | 4.8 | ○ | ○ | ○ | 5.0 | 1.11 |
| Ex. 6 | 5.6 | ○ | ○ | ○ | 4.9 | 1.13 |
| Ex. 7 | 11.3 | ○ | ○ | ○ | 5.1 | 1.13 |
| Ex. 8 | 25.0 | Δ | Δ | ○ | 5.2 | 1.12 |

The laminated polyester film of the present invention exhibits superior adhesive property, water resistance and resistance to blocking, particularly excellent adhesive property, by applying a specific polyester graft copolymer to a polyester base film.

This application is based on application No. 347553/1996 filed in Japan, the content of which is incorporated hereinto by reference.

What is claimed is:

1. A laminated polyester film comprising a polyester base film and a layer comprising a polyester graft copolymer and which is formed at least on one surface of said polyester base film, said polyester graft copolymer comprising a hydrophobic copolymerizable polyester resin and an acid anhydride having at least one double bond grafted to said polyester resin, wherein said layer is in the range of 0.01–1 g/m$^2$.

2. The laminated polyester film of claim 1, wherein the polyester graft copolymer comprises a maleic anhydride.

3. The laminated polyester film of claim 1, wherein the polyester graft copolymer comprises a maleic anhydride and a styrene.

4. The laminated polyester film of claim 1, wherein the polyester graft copolymer has a glass transition temperature of not more than 30° C.

5. The laminated polyester film of claim 1, wherein the polyester base film is opaque white and has a light transmission of less than 50%.

6. The laminated polyester film of claim 5, wherein the opaque white polyester film has voids and an apparent specific gravity of not more than 1.3.

7. A laminated polyester film comprising a stretched polyester base film and a layer comprising a polyester graft copolymer on at least one surface of said polyester base film, said polyester graft copolymer being a product of a reaction between a hydrophobic copolymerizable polyester resin and at least one polymerizable unsaturated monomer grafted to said polyester resin, wherein said layer is in the range of 0.01–1 g/m$^2$ and has a hydrogen bonding component of surface energy, $\gamma s^h$, of not more than 35 erg/cm$^2$, said laminated polyester film being formed by (1) applying a coating solution comprising the polyester graft copolymer on at least one surface of said polyester base film to form the layer comprising the graft copolymer;

(2) stretching said polyester base film; and (3) curing the laminated polyester film.

8. The laminated polyester film of claim 7, wherein the polyester graft copolymer comprises a maleic anhydride.

9. The laminated polyester film of claim 7, wherein the polyester graft copolymer comprises a maleic anhydride and a styrene.

10. The laminated polyester film of claim 7, wherein the polyester graft copolymer has a glass transition temperature of not more than 30° C.

11. The laminated polyester film of claim 7, wherein the $\gamma s^h$ is not more than 20 erg/cm$^2$.

12. The laminated polyester film of claim 7, wherein the polyester base film is opaque white and has a light transmission of less than 50%.

13. The laminated polyester film of claim 12, wherein the opaque white polyester film has voids and an apparent specific gravity of not more than 1.3.

14. A laminated polyester film comprising a stretched polyester base film and a layer comprising a polyester graft copolymer on at least one surface of said polyester base film, said polyester graft copolymer being a product of a reaction between a hydrophobic copolymerizable polyester resin and an acid anhydride having at least one double bond grafted to said polyester resin, wherein said layer is in the range of 0.01–1 g/m$^2$ and has a hydrogen bonding component of surface energy, $\gamma s^h$, of not more than 35 erg/cm$^2$.

* * * * *